United States Patent
Sovio et al.

(10) Patent No.: US 7,545,941 B2
(45) Date of Patent: Jun. 9, 2009

(54) METHOD OF INITIALIZING AND USING A SECURITY ASSOCIATION FOR MIDDLEWARE BASED ON PHYSICAL PROXIMITY

(75) Inventors: Sampo Sovio, Vantaa (FI); Philip Ginzboorg, Espoo (FI); Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 865 days.

(21) Appl. No.: 10/784,215

(22) Filed: Feb. 24, 2004

(65) Prior Publication Data
US 2005/0059379 A1    Mar. 17, 2005

Related U.S. Application Data

(63) Continuation-in-part of application No. 10/662,407, filed on Sep. 16, 2003.

(51) Int. Cl.
G06F 17/00 (2006.01)
G06F 17/30 (2006.01)

(52) U.S. Cl. .............................. 380/270; 726/2; 726/22
(58) Field of Classification Search ...................... 726/2
See application file for complete search history.

(56) References Cited

U.S. PATENT DOCUMENTS

| | | | |
|---|---|---|---|
| 5,521,251 A | 5/1996 | Satoh et al. | |
| 5,819,039 A | 10/1998 | Morgaine | |
| 6,112,103 A | 8/2000 | Puthuff | |
| 6,198,941 B1 | 3/2001 | Aho et al. | |
| 6,202,157 B1 * | 3/2001 | Brownlie et al. | 726/1 |

(Continued)

FOREIGN PATENT DOCUMENTS

EP    1246487 A2    2/2002

(Continued)

OTHER PUBLICATIONS

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

(Continued)

*Primary Examiner*—Nasser G Moazzami
*Assistant Examiner*—Chinwendu C Okoronkwo
(74) *Attorney, Agent, or Firm*—Locke Lord Bissell & Liddell

(57) ABSTRACT

A computer system, method, and computer program product for controlling data communication in an ad-hoc network that connects a wireless device and a nearby wireless device. The method stores an application directory, determines a priority for each entry in the application directory, identifies a selected entry based on the priority, and examines the attributes and security parameters associated with the selected entry. When the security parameters indicate to use a secure connection, the method establishes a security association to support the data communication by querying a database for an existing security association that will satisfy the security parameters. When the query is successful, the method reuses the existing security association. When the query is unsuccessful, the method creates a new security association by establishing a privileged side channel to the nearby wireless device, negotiating the new security association over the privileged side channel, and storing the new security association.

87 Claims, 7 Drawing Sheets

U.S. PATENT DOCUMENTS

| | | | |
|---|---|---|---|
| 6,219,696 | B1 | 4/2001 | Wynblatt et al. |
| 6,532,368 | B1 | 3/2003 | Hild et al. |
| 6,591,266 | B1 | 7/2003 | Li et al. |
| 6,601,093 | B1 | 7/2003 | Peters |
| 6,614,899 | B1 | 9/2003 | Sollee et al. |
| 6,631,269 | B1 | 10/2003 | Cave |
| 6,633,757 | B1 | 10/2003 | Hermann et al. |
| 6,657,713 | B2 | 12/2003 | Hansen |
| 6,757,715 | B1 | 6/2004 | Philyaw |
| 6,765,474 | B2 | 7/2004 | Eaton et al. |
| 6,909,721 | B2 | 6/2005 | Ekberg |
| 6,981,210 | B2 | 12/2005 | Peters et al. |
| 7,028,032 | B1 | 4/2006 | Diedrich et al. |
| 2002/0012329 | A1 | 1/2002 | Atkinson et al. |
| 2002/0039367 | A1 | 4/2002 | Seppala et al. |
| 2002/0044549 | A1 | 4/2002 | Johansson et al. |
| 2002/0073204 | A1 | 6/2002 | Dutta et al. |
| 2002/0078227 | A1* | 6/2002 | Kronenberg ............... 709/237 |
| 2002/0097724 | A1* | 7/2002 | Halme et al. ............... 370/392 |
| 2002/0120750 | A1 | 8/2002 | Nidd |
| 2002/0123360 | A1 | 9/2002 | Vikman et al. |
| 2002/0124046 | A1 | 9/2002 | Fischer et al. |
| 2002/0129170 | A1 | 9/2002 | Moore et al. |
| 2002/0152299 | A1 | 10/2002 | Traversat et al. |
| 2002/0160758 | A1 | 10/2002 | Pradhan et al. |
| 2002/0160793 | A1 | 10/2002 | Pradhan et al. |
| 2002/0178216 | A1 | 11/2002 | Walther et al. |
| 2002/0188657 | A1 | 12/2002 | Traversat et al. |
| 2003/0013483 | A1 | 1/2003 | Ausems et al. |
| 2003/0037033 | A1 | 2/2003 | Nyman et al. ............... 707/1 |
| 2003/0041141 | A1 | 2/2003 | Abdelaziz et al. |
| 2003/0054806 | A1 | 3/2003 | Ho et al. |
| 2003/0061364 | A1 | 3/2003 | Banerjee et al. |
| 2003/0069016 | A1 | 4/2003 | Bahl et al. ............... 455/432 |
| 2003/0078062 | A1 | 4/2003 | Burr |
| 2003/0110218 | A1 | 6/2003 | Stanley |
| 2003/0115415 | A1 | 6/2003 | Want et al. |
| 2003/0131059 | A1 | 7/2003 | Brown et al. |
| 2003/0207683 | A1 | 11/2003 | Lempio et al. |
| 2003/0208522 | A1 | 11/2003 | McDonnell et al. |
| 2003/0228842 | A1 | 12/2003 | Heinonen et al. |
| 2004/0002385 | A1 | 1/2004 | Nguyen |
| 2004/0009750 | A1 | 1/2004 | Beros et al. |
| 2004/0015403 | A1 | 1/2004 | Moskowitz et al. |
| 2004/0030743 | A1 | 2/2004 | Hugly et al. |
| 2004/0043770 | A1 | 3/2004 | Amit et al. |
| 2004/0063498 | A1 | 4/2004 | Oakes et al. |
| 2004/0063980 | A1 | 4/2004 | Raths et al. |
| 2004/0064568 | A1 | 4/2004 | Arora et al. |
| 2004/0075675 | A1 | 4/2004 | Raivisto et al. |
| 2004/0087274 | A1 | 5/2004 | Ekberg et al. |
| 2004/0114557 | A1 | 6/2004 | Bryan et al. |
| 2004/0165588 | A1* | 8/2004 | Pandya ............... 370/389 |
| 2004/0171378 | A1 | 9/2004 | Rautila |
| 2004/0224706 | A1 | 11/2004 | Lorello et al. |
| 2004/0225712 | A1 | 11/2004 | Tajima et al. |
| 2005/0058108 | A1 | 3/2005 | Ekberg et al. |
| 2005/0058109 | A1 | 3/2005 | Ekberg |
| 2005/0059379 | A1 | 3/2005 | Sovio et al. |
| 2005/0088980 | A1 | 4/2005 | Olkkonen et al. |
| 2005/0114756 | A1 | 5/2005 | Lehikoinen et al. |
| 2005/0185660 | A1 | 8/2005 | Ekberg et al. |
| 2005/0208892 | A1 | 9/2005 | Kotola et al. |
| 2005/0239494 | A1 | 10/2005 | Klassen et al. |
| 2006/0058011 | A1 | 3/2006 | Vanska et al. |
| 2006/0199533 | A1 | 9/2006 | Zilliacus et al. |
| 2006/0258338 | A1 | 11/2006 | Markki et al. |
| 2006/0268896 | A1 | 11/2006 | Kotola et al. |

FOREIGN PATENT DOCUMENTS

| | | |
|---|---|---|
| EP | 1207707 A1 | 5/2002 |
| EP | 1242986 B1 | 9/2002 |
| EP | 123540 A2 | 10/2002 |
| EP | 1246487 A3 | 10/2002 |
| EP | 1392023 A2 | 2/2004 |
| EP | 1392023 A3 | 2/2004 |
| EP | 1505811 A1 | 2/2005 |
| GB | 2410153 A | 7/2005 |
| JP | 2003/016347 A1 | 1/2003 |
| WO | WO 99/41876 | 8/1999 |
| WO | 0072506 A1 | 11/2000 |
| WO | WO 00/72506 A1 | 11/2000 |
| WO | WO 01/31960 A1 | 5/2001 |
| WO | WO 01/45319 | 6/2001 |
| WO | WO 01/95592 A1 | 12/2001 |
| WO | WO 02/071285 A1 | 9/2002 |
| WO | WO 03/034664 | 4/2003 |
| WO | WO 03/055150 A2 | 7/2003 |
| WO | WO 03/055238 A1 | 7/2003 |
| WO | WO 2004/038541 A2 | 5/2004 |
| WO | WO 2004/091143 A2 | 10/2004 |
| WO | WO 2005/038696 A1 | 4/2005 |
| WO | WO 2006/092688 A2 | 9/2006 |

OTHER PUBLICATIONS

"Assigned Numbers—Bluetooth Baseband", article [online], Bluetooth SIG., Inc. 1999-2001 [7 pages retrieved on Sep. 3, 2003]. Retrived from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [5 pagses retrieved on Sep. 3, 2003]. Retrieved from the Internet <http://www.bluetoothsig.org/assigned-numbers/host.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conference—NDSS", web page [online], Internet Society, 2002 [1 page retrieved on Oct. 23, 2003]. Retrieved from the Internet: <http://www.isoc.org/isoc/conference/ndss>.

"Internet society (ISOC): All About The Internet", web page [online], Internet Society, 2002 [1 page retrieved on Oct. 23, 2003]. Retrieved from the Internet: <http://www.isoc.org/isoc/conference/ndss/02/>.

"NDSS Conference Proceedings: 2002", web page [online], Internet Society [2 pages retrieved on Oct. 23, 2003]. Retrieved from the Internet: <http://www.isoc.org/isoc/conference/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

U.S. Appl. No. 10/284,135, filed Oct. 31, 2002, Ekberg et al.

U.S. Appl. No. 10/662,407, filed Sep. 16, 2003, Ekberg et al.

U.S. Appl. No. 10/662,470, filed Sep. 16, 2003, Ekberg.

U.S. Appl. No. 10/662,469, filed Sep. 16, 2003, Ekberg et al.

PCT Search Report (Aug. 31, 2004).

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN; 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" Systems Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

Communication (Apr. 25, 2005); EP Search Report.

EPO Communication, 4 pgs. (Oct. 17, 2005).

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

"Assigned Numbers—Bluetooth Baseband", article [online], Bluetooth SIG., Inc. 1999-2001 [7 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [5 pagse retrieved on Sep. 3, 2003]. Retrieved from the Internet <http://www.bluetoothsig.org/assigned-numbers/host.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conference—NDSS", web page [online], Internet Society, 2002 [1 page retrieved on Oct. 23, 2003]. Retrieved from the Internet: <http://www.isoc.org/isoc/conference/ndss>.

"Internet society (ISOC): All About The Internet", web page [online], Internet Society, 2002 [1 page retrieved on Oct. 23, 2003]. Retrieved from the Internet: <http://www.isoc.org/isoc/conference/ndss/02/>.

"NDSS Conference Proceedings: 2002", web page [online], Internet Society [2 pages retrieved on Oct. 23, 2003]. Retrieved from the Internet: <http://www.isoc.org/isoc/conference/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN; 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" Systems Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

PCT International Search Report for PCT/Ib2006/001347, Oct. 24, 2006, 4 pages.

* cited by examiner

METHOD OF INITIALIZING AND USING A SECURITY ASSOCIATION FOR MIDDLEWARE BASED ON PHYSICAL PROXIMITY

CROSS-REFERENCE TO RELATED APPLICATIONS

This application for letters patent is related to and incorporates by reference U.S. patent application Ser. No. 10/284,135, titled "DEVICE DETECTION AND SERVICE DISCOVERY SYSTEM AND METHOD FOR A MOBILE AD HOC COMMUNICATIONS NETWORK", and filed in the United States Patent and Trademark Office on Oct. 31, 2002. This application for letters patent is also related to and incorporates by reference U.S. continuation-in-part patent application Ser. No. 10/662,407, titled "DEVICE DETECTION AND SERVICE DISCOVERY SYSTEM AND METHOD FOR A MOBILE AD HOC COMMUNICATIONS NETWORK", and filed in the United States Patent and Trademark Office on Sep. 16, 2003. This application for letters patent is also related to and incorporates by reference U.S. patent application Ser. No. 10/662,470, titled "MECHANISM FOR IMPROVING CONNECTION CONTROL IN PEER-TO-PEER AD-HOC NETWORKS", and filed in the United States Patent and Trademark Office on Sep. 16, 2003. This application for letters patent is also related to and incorporates by reference U.S. patent application Ser. No. 10/662,469, titled "APPLICATION CONTROL IN PEER-TO-PEER AD-HOC COMMUNICATION NETWORKS", and filed in the United States Patent and Trademark Office on Sep. 16, 2003. The assignee is the same in this application and the related patent applications.

FIELD OF THE INVENTION

The present invention relates, in general, to communication between devices connected to a wireless communication network. In particular, the present invention is a system and method for launching and controlling secure and non-secure application programs in wireless devices in a mobile ad-hoc communications network.

BACKGROUND OF THE INVENTION

Short-range wireless systems have a range of less than one hundred meters, but may connect to the Internet to provide communication over longer distances. Short-range wireless systems include, but are not limited to, a wireless personal area network (PAN) and a wireless local area network (LAN). A wireless PAN uses low-cost, low-power wireless devices that have a typical range of ten meters. An example of a wireless PAN technology is the Bluetooth Standard. The Bluetooth Standard operates in the 2.4 GHz Industrial, Scientific, and Medical (ISM) band and provides a peak air-link speed of one Mbps and a power consumption low enough for use in personal, portable electronics such as a personal digital assistance or mobile phone. A introduction to Bluetooth applications is in *Bluetooth Application Developer's Guide: The Short Range Interconnect Solution. Chapter* 1, Syngress Publishing, Inc., 2002. Another example of a wireless PAN technology is a standard for transmitting data via infrared light waves developed by the Infrared Data Association (IrDA), a group of device manufacturers. IrDA ports enable computers, such as a laptop, or devices, such as a printer, to transfer data from one device to another without any cables. IrDA ports support roughly the same transmission rates as traditional parallel ports and the only restrictions on their use is that the two devices must be proximately located (i.e., within a few feet of each other) and have a clear line of sight. A wireless LAN is more costly than a wireless PAN, but has a longer range. An example of a wireless LAN technology is the IEEE 802.11 Wireless LAN Standard and the HIPERLAN Standard. The HIPERLAN Standard operates in the 5 GHz Unlicensed-National Information Infrastructure (U-NII) band and provides a peak air-link speed between ten and one hundred Mbps.

An ad-hoc network is a short-range wireless system comprising an arbitrary collection of wireless devices that are physically close enough to exchange information. Construction of an ad-hoc network is quick with wireless devices joining and leaving the network as they enter and leave the proximity of the remaining wireless devices. An ad-hoc network also may include one or more access points, that is, stationary; wireless devices operating as a stand-alone server or as gateway connections to other networks.

In the future, the Bluetooth Standard will likely support the interconnection of multiple piconets to form a multi-hop ad-hoc network, or scatternet. In a scatternet, a connecting device forwards traffic between different piconets. The connecting device may serve as a master device in one piconet, but as a slave device or a master device in another piconet. Thus, the connecting devices join the piconets that comprise a scatternet by adapting the timing and hop sequence to the respective piconet and possibly changing the roles that they serve from a master device to a slave device.

A Bluetooth device includes, but is not limited to, a mobile telephone, personal or laptop computer, radio-frequency identification tag, and personal electronic device such as a personal digital assistant (PDA), pager, or portable-computing device. Each Bluetooth device includes application and operating system programs designed to find other Bluetooth devices as they enter and leave the communication range of the network. The requesting Bluetooth device in a client role and the responding Bluetooth device in a server role establish a proximity link between the two devices. The requesting and responding Bluetooth device use the proximity link and a service discovery protocol to discover the services offered by the other Bluetooth device and how to connect to those services.

A public key infrastructure (PKI) is a system of digital certificates, certificate authorities (CAs), and other registration authorities that verify and authenticate the validity of each party involved in an Internet transaction. A digital certificate is an attachment to an electronic message typically to verify that a user sending a message is who they claim to be, and to provide the receiver with the means to encode a reply. An individual wishing to send an encrypted message applies for a digital certificate from a CA. The CA issues a signed digital certificate containing the applicant's public key and a variety of other identification data. The CA makes its own public key readily available through print publicity or perhaps on the Internet. The recipient of an encrypted message uses the CA's public key to verify the digital certificate attached to the message, verify that it was issued by the CA, and obtain the sender's public key and identification information held within the certificate. With this information, the recipient can send an encrypted reply. The most widely used standard for digital certificates is X.509.

Cryptography is the art of protecting information by transforming (i.e., encrypting) the information into an unreadable format, called cipher text. Only someone who possesses a secret key can decipher (i.e., decrypt) the cipher text into plain text. Symmetric-key systems and public-key systems are broad classifications of cryptography systems. A symmetric-key system (e.g., the Data Encryption Standard (DES)) is an encryption system in which the sender and receiver of a message share a single, common key that is used to encrypt and decrypt the message. A public-key system (e.g., Pretty Good Privacy (PGP)) uses two keys, a public key known to everyone and a private or secret key known only to the recipient of the message. When John wants to send a secure message to Jane, he uses Jane's public key to encrypt the message. Jane then uses her private key to decrypt the message. Symmetric-key systems are simpler and faster than public-key systems, but their main drawback is that the two parties must somehow exchange the key in a secure way. To avoid this drawback, public-key systems distribute the public key in a non-secure way and never transmit the private key.

The problem of secure communication and authentication in ad-hoc wireless networks has been addressed in a paper titled *Talking to Strangers: Authentication in Ad-Hoc Wireless Networks* by Balfanz et al. The authors present a solution that provides secure authentication using almost any established public-key-based key exchange protocol, as well as inexpensive hash-based alternatives. The solution allows devices to exchange a limited amount of public information over a privileged side channel, and then allows the devices to complete an authenticated key exchange protocol over the wireless link. The solution does not require a PKI, is secure against passive attacks on the privileged side channel and all attacks on the wireless link, and directly captures the user's intention to communicate with a particular previously unknown device that is within their physical proximity.

For wireless devices that communicate in a peer-to-peer ad-hoc network, prior art middleware facilitates inter-application communication by hiding peer-discovery, network formation, application and service discovery, as well as automatic application launching, behind an easy-to-use coherent application programming interface (API). However, since no trusted, accessible, third party based solution is available, establishing secure communication and authentication is difficult for the prior art middleware.

Thus, there is a need for a system and method for providing secure communication between selected applications in wireless ad-hoc network devices that rely upon middleware to facilitate inter-application communication. The system and method will provide the means to implement a security API for application-level access to other security services based on the generated peer-to-peer security associations. The system and method do not require a highly available server or PKI and improve establishment of security by relying on a user to enter a password. The present invention addresses this need.

SUMMARY OF THE INVENTION

A computer system, method, and computer program product for controlling data communication in an ad-hoc network that connects a wireless device and a nearby wireless device. The method stores an application directory, determines a priority for each entry in the application directory, identifies a selected entry based on the priority, and examines the attributes and security parameters associated with the selected entry. When the security parameters indicate to use a secure connection, the method establishes a security association to support the data communication by querying a database for an existing security association that will satisfy the security parameters. When the query is successful, the method reuses the existing security association. When the query is unsuccessful, the method creates a new security association by establishing a privileged side channel to the nearby wireless device, negotiating the new security association over the privileged side channel, and storing the new security association.

The attributes include a device identifier, a role, and control parameters such as an application state and at least one user-defined application setting. The security parameters include an information security objective (e.g., maintaining confidentiality, ensuring integrity, authenticating a party, and protecting against replay or reuse), a cryptography method for attaining the information security objective (e.g., a signature verification service, and an encryption algorithm), and a level of security. In one embodiment, a bit-string includes the security parameters, a value of the bit-string representing each of the security parameters.

In one embodiment, to reconnect to a secure connection the method stores a security association between the wireless device and the nearby wireless device when the nearby wireless device enters the ad-hoc network for a first encounter. The method stores a copy of the security association so that when the first encounter terminates, the method can remove the security association and retain the copy. When the nearby wireless device enters the ad-hoc network for a second encounter, the method establishes a secure connection to the nearby device based on the copy of the security association. In another embodiment, the method establishes the secure connection by searching a connection log to locate the copy of the security association. In another embodiment, storage of the connection log is on a long-term storage device. In another embodiment, a user operates a graphical user interface to locate the copy of the security association.

BRIEF DESCRIPTION OF THE DRAWINGS

The accompanying figures best illustrate the details of the system and method for providing secure communication between selected applications in wireless ad-hoc network devices that rely upon middleware to facilitate inter-application communication. Like reference numbers and designations in these figures refer to like elements.

DETAILED DESCRIPTION OF THE INVENTION

Figure 1:
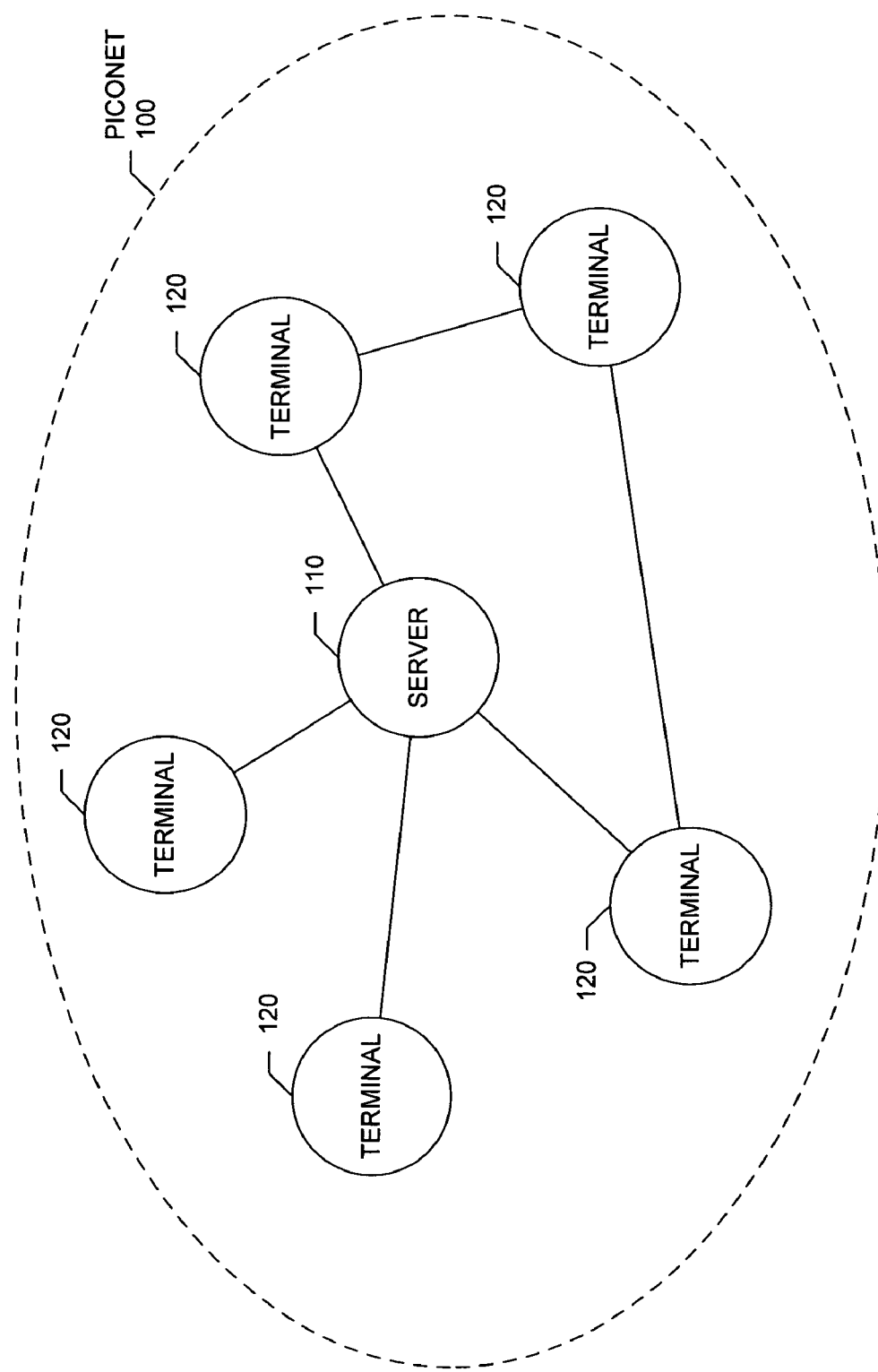
FIG. 1 is a network diagram that illustrates the interaction of the devices that comprise a mobile ad-hoc communications network, in accordance with one embodiment of the present invention.

FIG. 1 is a network diagram that illustrates the interaction of the devices that comprise a mobile ad-hoc communications network, in accordance with one embodiment of the present invention. In one embodiment, the mobile ad-hoc communications network is a Bluetooth piconet that includes one master device and up to seven active slave devices. As shown in FIG. 1, piconet 100 includes server 110 and five instances of terminal 120. Server 110 maintains the network clock and is the communication manager for each instance of terminal 120. Server 110 typically initiates an exchange of data with an instance of terminal 120. Two instances of terminal 120 typically communicate through the server 110 however, if two instances of terminal 120 communicate directly, one instance will assume the role of server, or master, and the other instance will assume the role of client, or slave.

Each device in the mobile ad-hoc communications network will either assume the role of a terminal device or a server device. A terminal device is a consumer of services that a single user operates. A terminal device includes devices such as a mobile phone or PDA. A server is typically a stationary device and only produces services. A server device creates a hotspot around them for using their services. "Hotspot" refers to the radio coverage area provided by the server device for detecting devices and discovering services offered by the applications hosted in the server. If the server device is not stationary, one of the terminal devices in the network will assume the role of application directory server and perform device detection and service discovery functions for the remaining terminal devices in the network. The disclosed invention introduces two roles among such terminal devices, application directory servers and terminals, where application directory servers serve terminals in device detection and service discovery. If stationary servers with hotspots exist, servers typically act as application directory servers. However, device detection and service discovery is possible without such a stationary server because one of the terminals will assume the application directory server duties.

The disclosed invention assigns an identifier to each application placed under control. In one embodiment, the identifier is a non-unique identifier that abstractly identifies the application. In another embodiment, the identifier specifies a function that the application performs. In another embodiment, the identifier specifies a communication protocol that the application uses to communicate. Thus, the identifier may indicate that several occurrences of an application each occurrence authored in a different computer language, or targeted to run on a different hardware platform or fulfill a different application role may be considered to be the same because they can interoperate and fulfill the same function. However, in yet another embodiment, the identifier is a unique identifier that identifies the application.

Figure 2A:
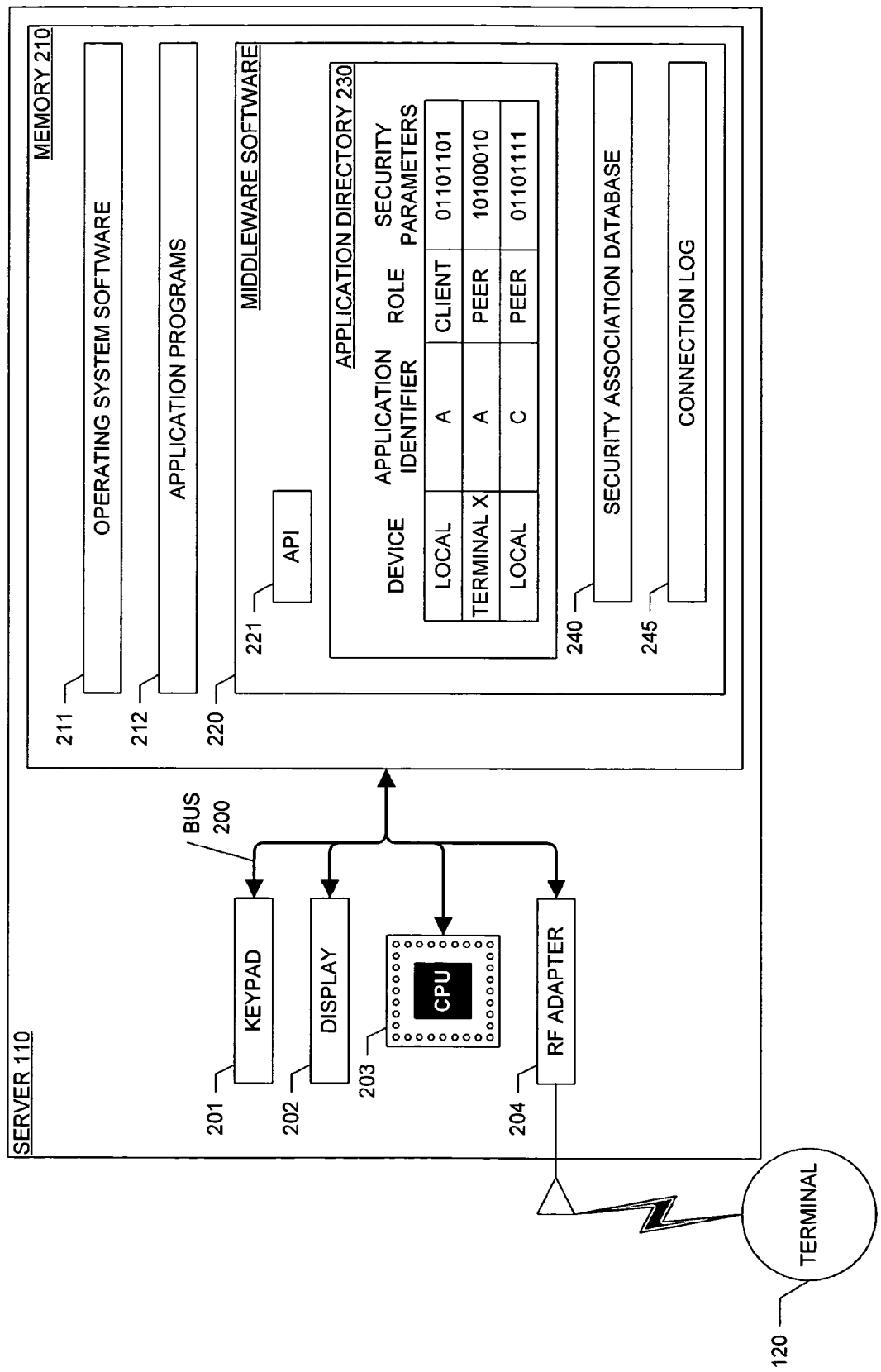
FIG. 2A is a block diagram that illustrates the hardware and software components comprising server 110 shown in FIG. 1, in accordance with one embodiment of the present invention.

FIG. 2A is a block diagram that illustrates the hardware and software components comprising server 110 shown in FIG. 1, in accordance with one embodiment of the present invention. Server 110 is a general-purpose wireless device. Bus 200 is a communication medium that connects keypad 201, display 202, central processing unit (CPU) 203, and radio frequency (RF) adapter 204 to memory 210. RF adapter 204 connects via a wireless link to terminal 120 and is the mechanism that facilitates network traffic between server 110 and terminal 120.

CPU 203 performs the methods of the disclosed invention by executing the sequences of operational instructions that comprise each computer program resident in, or operative on, memory 210. Memory 210 includes operating system software 211, application programs 212, and middleware software 220. Operating system software 211 controls keypad 201, display 202, RF adapter 204, and the management of memory 210. Application programs 212 control the interactions between a user and server 110 including a proximity security initialization program. Middleware software 220 includes an application program interface (API) 221, application directory 230, security association database 240, and connection log 245. API 221 assists an application program running on server 110 to find and communicate with a counterpart application running on terminal 120. Application directory 230 tracks, for each application that is resident in each device in piconet 100, a reference to the device storing the application, an identifier for the application, the role that the application performs, and the security parameters that define the required policy configuration attributes and security services. In one embodiment, the reference to the device storing the application is the MAC address of the device. Security association database 240 stores all recent, pair-wise and group associations established by the proximity security initialization program. Connection log 245 stores recent connections to server 110, such as general packet radio service (GPRS), Bluetooth, or wireless local area network (WLAN) connection. In one embodiment, middleware software 220 integrates the storage of any combination of application directory 230, security association database 240, and connection log 245.

Figure 2B:
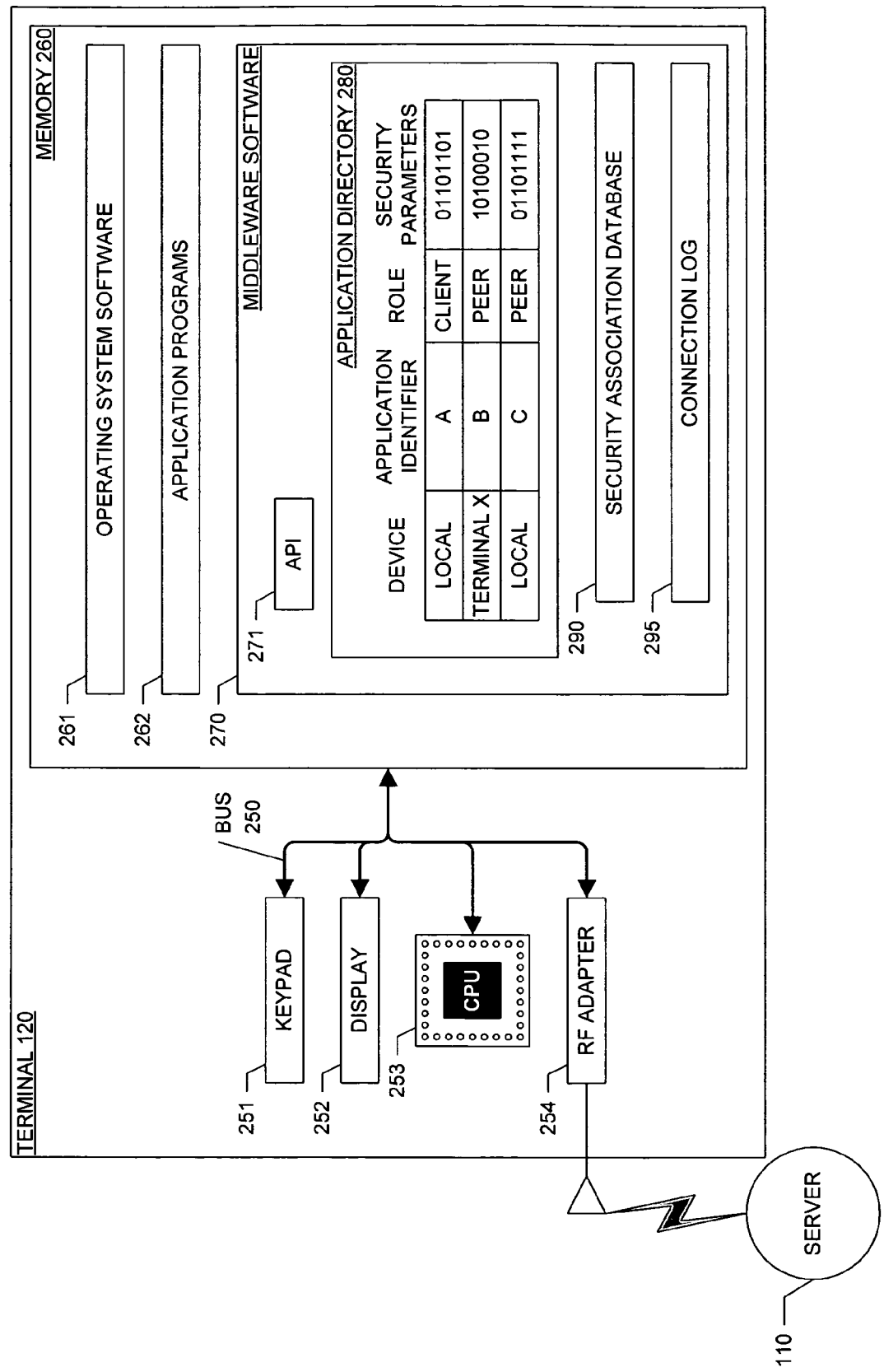
FIG. 2B is a block diagram that illustrates the hardware and software components comprising terminal 120 shown in FIG. 1, in accordance with one embodiment of the present invention.

FIG. 2B is a block diagram that illustrates the hardware and software components comprising terminal 120 shown in FIG. 1, in accordance with one embodiment of the present invention. Terminal 120 is a general-purpose wireless device. Bus 250 is a communication medium that connects keypad 251, display 252, CPU 253, and RF adapter 254 to memory 260. RF adapter 254 connects via a wireless link to server 110 or another terminal 120 and is the mechanism that facilitates network traffic between server 110 and terminal 120.

CPU 253 performs the methods of the disclosed invention by executing the sequences of operational instructions that comprise each computer program resident in, or operative on, memory 260. Memory 260 includes operating system software 261, application programs 262, and middleware software 270. Operating system software 261 controls keypad 251, display 252, RF adapter 254, and the management of memory 260. Application programs 262 control the interactions between a user and terminal 120 including a proximity security initialization program. Middleware software 270 includes an application program interface (API) 271, application directory 280, security association database 290, and connection log 295. API 271 assists an application program running on server 110 to find and communicate with a counterpart application running on terminal 120. Application directory 280 tracks, for each application that is resident in each device in piconet 100, a reference to the device storing the application, an identifier for the application, the role that the application performs, and the security parameters that define the required policy configuration attributes and security services. In one embodiment, the reference to the device storing the application is the MAC address of the device. Security association database 290 stores all recent, pair-wise and group associations established by the proximity security initialization program. Connection log 295 stores recent connections to terminal 120, such as general packet radio service (GPRS), Bluetooth, or wireless local area network (WLAN) connection. In one embodiment, middleware software 270 integrates the storage of any combination of application directory 280, security association database 290, and connection log 295.

In one embodiment, the configuration of memory 210 and memory 260 is identical. In another embodiment, the configuration of memory 210 and memory 260 only includes the software necessary to perform the essential tasks of server 110 and terminal 120, respectively. For example, if terminal 120 needs to receive a general inquiry access code, but does not need to send a general inquiry access code message, only the software that receives this message will reside in memory 260.

In the disclosed invention, the distributed application directory stored in the middleware software is a database that makes it possible for a device to know something of the requirements and wishes of peer devices to which it connects. The database also contains information of local applications and their requirements. The information includes security parameters, as well as priority information, indicating importance of the application set by the user. The distributed application directory, or database, stores these security parameters and the middleware software enforces these security parameters. In one embodiment, these security parameters are stored as a bit-string where the bits allow the user to enable application-level access control for each entry in the application. Thus, the user may set the security parameters to indicate that a specific application requires that a specific security association is present before communicating with a complementary application running on another device.

As shown in FIG. 2A and FIG. 2B, the security parameters are a bit-string in which the first four bits identify a communication security type, the next two bits identify a required security API service, and the last two bits identify a level of security. The communication security type identifies the information security objective sought. Information security objectives include keeping information private or confidential, ensuring the integrity of the information, authenticating the identity of the parties to the communication, protecting against replay or reuse of the information, and the like. The specified security API service identifies cryptography methods for required application by obtaining the information security objective. The cryptography method includes signature services, encryption algorithms, and the like. The level of security determines the algorithm as well as the way information is collected. For example, higher-level security may require the use of certain location-limited channels when the security context is established. Other parameters that may be affected by the level of security are the validity period of the established security context or the validity of third-party information. For example, in low-level security formation group keys may well be used for channel protection in a way where pair-wise security establishment may not be needed between every possible pair in the group.

Middleware software 220 and 270 stores in security association database 240 or 290 all recent, pair-wise and group security associations established by a proximity security initialization program. However, middleware software 220 and 270 only establishes the security associations between devices, not applications. Middleware software 220 and 270 is also responsible for purging records based on validity period settings and use order (e.g., when the database fills up, purging the oldest and least used associations). For example, if device D and peer P are each running application X, middleware software 220 or 270 sends a query to security association database 240 or 290 for an existing and valid security association between D and P. If security association A exists and satisfies the security parameters associated with X, security association A is used and no other security association between D and P is needed.

According to one embodiment, a security association includes fields for identifying the peer device and security parameters. The fields for identifying the peer device may specify the local device identity as seen by the peer device (i.e., external) or may specify the identity of the peer device as seen by the local device (i.e., internal). The security parameters, in addition to the security parameters shown in FIG. 2A and FIG. 2B, include a cryptographic digest (e.g., a thumbprint of a certificate), a public key pair, secret keys of a peer device, and a possible lifetime of key material.

Middleware software 220 and 270 may also prioritize both secure and non-secure applications. To minimize application congestion on the mobile terminal, the prioritization is concerned with runnable, automatically launching applications in the local network. The. related application titled "Application Control in Peer-to-Peer Ad-Hoc Communication Networks" describes a system and method for launching and controlling non-secure application programs resident in wireless devices in a spontaneous and instant (ad-hoc) communications network. One aspect of that system and method chooses the highest priority application and automatically launches the application if the application is "runnable" and the appropriate user-defined flags are set. The system and method disclosed herein addresses the task of prioritizing secure and non-secure, runnable applications that can be automatically launched. Thus, the system and method disclosed herein minimizes "application congestion" on a mobile terminal that includes secure and non-secure applications.

Middleware software 220 and 270 facilitates inter-application communication by hiding peer discovery, network formation, application and service discovery as well as automatic application launching. When two mobile devices meet, the devices exchange (i.e., distribute) application directory data that describes the applications and peer devices on the network. Using the application directory data, the mobile devices can launch and control application programs resident in wireless devices in a mobile ad-hoc communications network. However, communication in a secure manner requires the integration of the application directory and proximity security initialization software. For each application and terminal in the application directory, the user may set a requirement to use a secure channel, as well as additional information (e.g., the user may set a requirement that the application requires a digital signature facility from a cryptography API). Before launching an application that requires a secure channel, two proximate mobile devices first determine whether an existing security association will support the secure channel communication. If a security association already exists, the matching applications will launch and utilize the security association. If a security association does not exist, both devices will launch proximity security initialization software to use a location-limited (i.e., proximity) side channel, such as an infrared data association (IrDA) port, to authenticate the devices and negotiate a security association. When the negotiation is complete, the matching applications launch and utilize the negotiated security association.

Figure 3A:
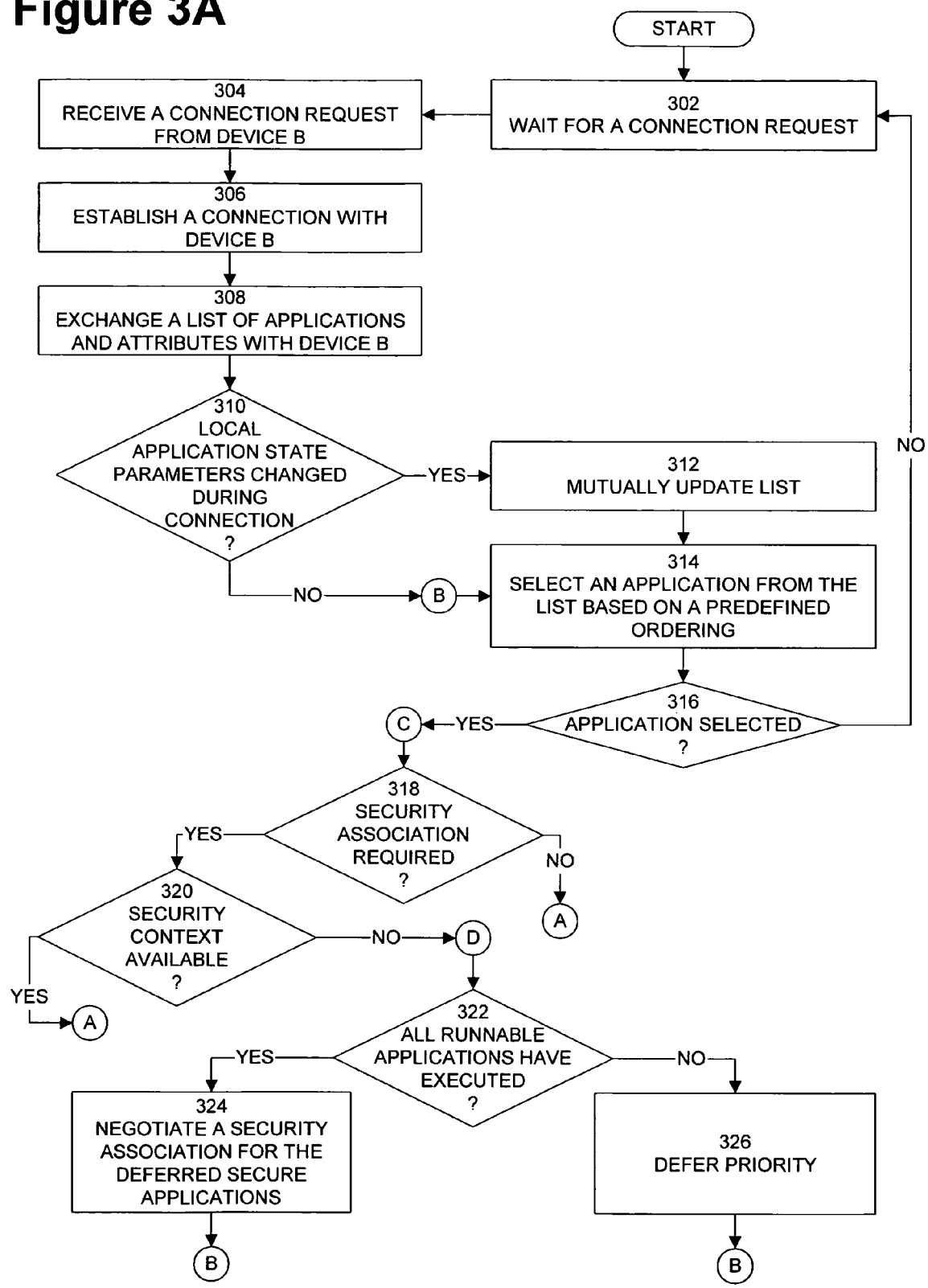
FIG. 3A and FIG. 3B are flow diagrams of an embodiment of a process for launching and controlling secure and non-secure application programs in a mobile ad-hoc communications network.
Figure 3B:
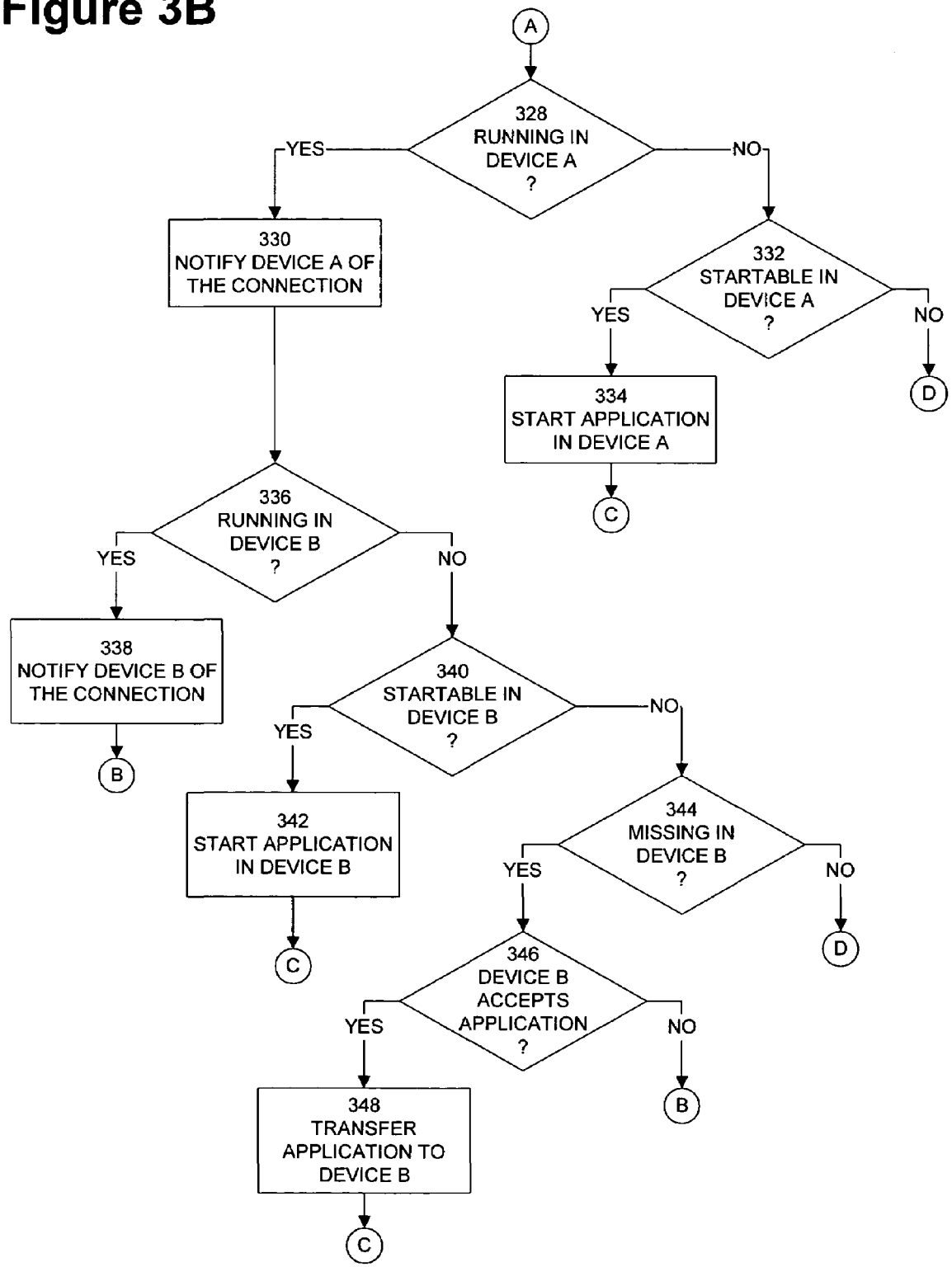

FIG. 3A and FIG. 3B are flow diagrams of an embodiment of a process for launching and controlling secure and non-secure application programs in a mobile ad-hoc communications network. The process in FIG. 3A begins when a mobile device (device A) waits for a connection request from the network (step 302). A proximate mobile device (device B) enters the network and sends a connection request to device A (step 304). Device A and device B establish a connection (step 306) and exchange a list of applications and attributes (step 308). If local application state parameters have changed during the connection (step 310), device A and device B mutually update their list of applications and attributes (step 312) and the requesting one of the devices select an application from the list based on a predefined ordering (step 314). If local application state parameters have not changed during the connection (step 310), the requesting one of the devices select an application from the list based on a predefined ordering (step 314).

If the processing exhausts the list of applications (step 316), the process returns to waiting for a connection request (step 302). If the processing selects an application (step 316) and if the selected application does not require a security association (step 318), the processing of the selected application continues from step 328 as shown in FIG. 3B. If the selected application requires a security association (step 318) and if security association database 240 or 290 includes a security context for the selected application (step 320), the processing of the selected application continues from step 328 as shown in FIG. 3B. If security association database 240 or 290 does not include a security context for the selected application (step 320) and if all runnable applications have not executed (step 322), the process defers the priority of the selected application (step 326) and continues from step 314 as shown in FIG. 3A. If security association database 240 or 290 does not include a security context for the selected application (step 320) and if all runnable applications have executed (step 322), the process negotiates a security association for the deferred secure applications (step 324) and continues from step 314 as shown in FIG. 3A.

In another embodiment, rather than defer the priority of the selected application until all runnable applications have executed (step 326), the process launches the proximity security initialization software on an as needed basis to establish a secure. connection for the selected application. In yet another embodiment, the mobile device selects whether to defer the priority or launch the proximity security initialization software based on the computing performance required by the user of the mobile device.

The process in FIG. 3B begins with examining the attributes associated with the selected application. If the selected application is running in device A (step 328) and running in device B (step 336), the process notifies device A and device B of the connection (step 330 and step 338) and selects the next application from the list (step 314). If the selected application is running in device A (step 328), is not running in device B (step 336), and is startable in device B (step 340), device B starts the selected application (step 342) and the process continues from step 318 as shown in FIG. 3A. If the selected application is running in device A (step 328), is not running in device B (step 336), is not startable in device B (step 340), and is missing in device B (step 344), then if device B will accept the selected application (step 346), device A transfers the selected application to device B (step 348) and the process continues from step 318 as shown in FIG. 3A. If the selected application is not running in device A (step 328), but is startable in device A (step 332), the process starts the selected application in device A (step 334) and continues from step 318 as shown in FIG. 3A. If the selected application is running in device A (step 328), is not running in device B (step 336), is not startable in device B (step 340), and is not missing from device B (step 344), the process continues from step 322 as shown in FIG. 3A. If the selected application is not running in device A (step 328) and is not startable in device A (step 332), the process continues from step 322 as shown in FIG. 3A.

To negotiate the security association, middleware software 220 or 270 launches proximity security initialization software. The proximity security initialization software enables two devices, such as server 110 and terminal 120, that have no prior security context to authenticate each other based on some kind of user-initiated physical authentication and in a resulting communication protocol generate a security association. There mutual authentication protocols include each user entering a common password into their device, using a location-limited channel as described in Balfanz, visual or short has mutual verification by the users, and pair-wise biometric identification (i.e., entering biometric data in the peer device that the local device authenticates).

If a security association between two peer devices does not exist, middleware software 220 or 270 for the first peer device sends a request to establish a security association between the first and the second peer device. The proximity security initialization software resident in the first device negotiates the security association, including peer identification data, over a location-limited channel. Once negotiation of the security association is complete, the proximity security initialization software offers the location-limited channel for use to middleware software 220 or 270 and the application that requires the security association.

If the security association between the two peer devices exists, before an application that requires security can launch, the proximity security initialization software enforces the security policy set in application directory 230 or 280. The proximity security initialization software retrieves the correct security association from middleware 220 or 270, and configures the necessary security protocols (e.g., Bluetooth pairing, or Transport Layer Security/Internet Protocol Security). The application that requires security launches after establishment of the security services. However, if the security policy for the application requests ;a security application program interface (API) the proximity; security initialization software also configures the required cryptographic services. In another embodiment, when critical security levels are in use, the security associations stored in middleware 220 or 270 may be protected and require user interaction (e.g., entering a password, or providing biometric data).

In another embodiment, the definitions of the security associations are application specific. This approach requires the proximity security initialization software to negotiate a specific security association for each pair-wise application that needs security according to the associated security policy. Also, the proximity security initialization software and the communication infrastructure provide support for multiplexing several security contexts over the communications channel based on the associations in use.

Figure 3C:
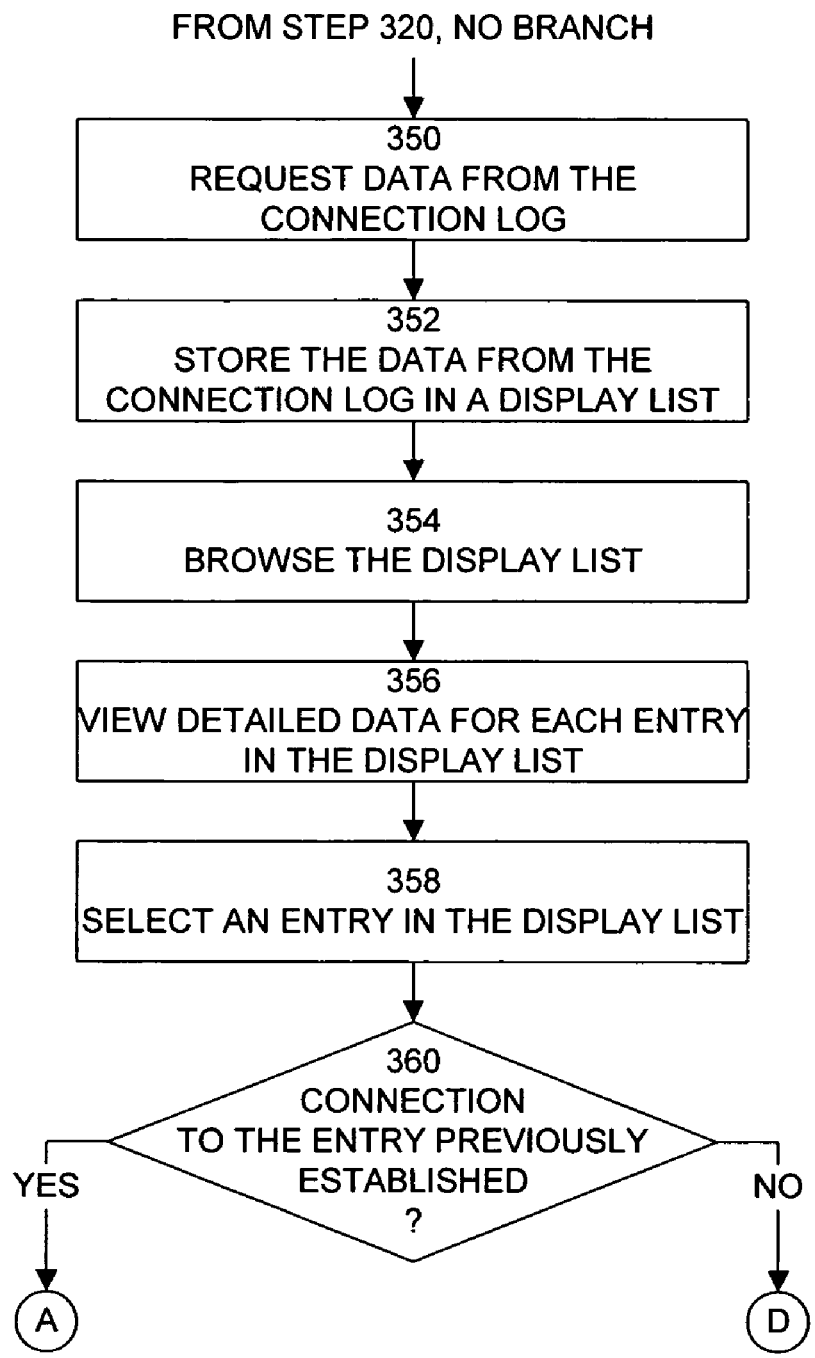
FIG. 3C is a flow diagram of an embodiment of a process for reconnecting a secure application program in a mobile ad-hoc communications network.

FIG. 3C is a flow diagram of an embodiment of a process for reconnecting a secure application program in a mobile ad-hoc communications network. If security association database 240 or 290 does not include a security context for the selected application (step 320), the process optionally sends a request to middleware software 220 and 270 for data from connection log 245 or 295 (step 350). The process stores the data supplied in response to the request in a display list (step 352). The display list provides a user with the ability to browse the display list (step 354), view detailed data for each entry in the display list (step 356), and select an entry in the display list (step 358). If the entry selected is a previously established connection (step 360), the process continues from step 328 as shown in FIG. 3B. If the entry selected is not a previously established connection (step 360), the process continues from step 322 as shown in FIG. 3A.

Connection log 245 and 295, and security association database 240 and 290, store in a similar manner initialization parameters that describe a secure application connection. These initialization parameters include fields for identifying the device, and fields for security parameters. The fields for identifying the device include, for example, the local device identity as seen by the peer device, and the peer device identity as seen by the local device. The fields for security parameters include, for example, Cryptographic Digest such as a thumbprint of a certificate, public key of the peer device, secret keys of the peer device, and the possible lifetime of the key material. However, in contrast, connection log 245 and 295 is longer-term storage than security association database 240 and 290. For example, security association database 240 and 290 may only store the initialization parameters for the duration of the application connection and release the storage of those parameters when the user exits the application. Since connection log 245 and 295 retains a copy of those initialization parameters for a longer period of time, the peer device can leave the ad-hoc network and upon returning to the network immediately start the application using the initialization parameters. Thus, the returning peer device need not re-establish a location-limited channel to touch the local device and begin secure communications.

Figure 4:
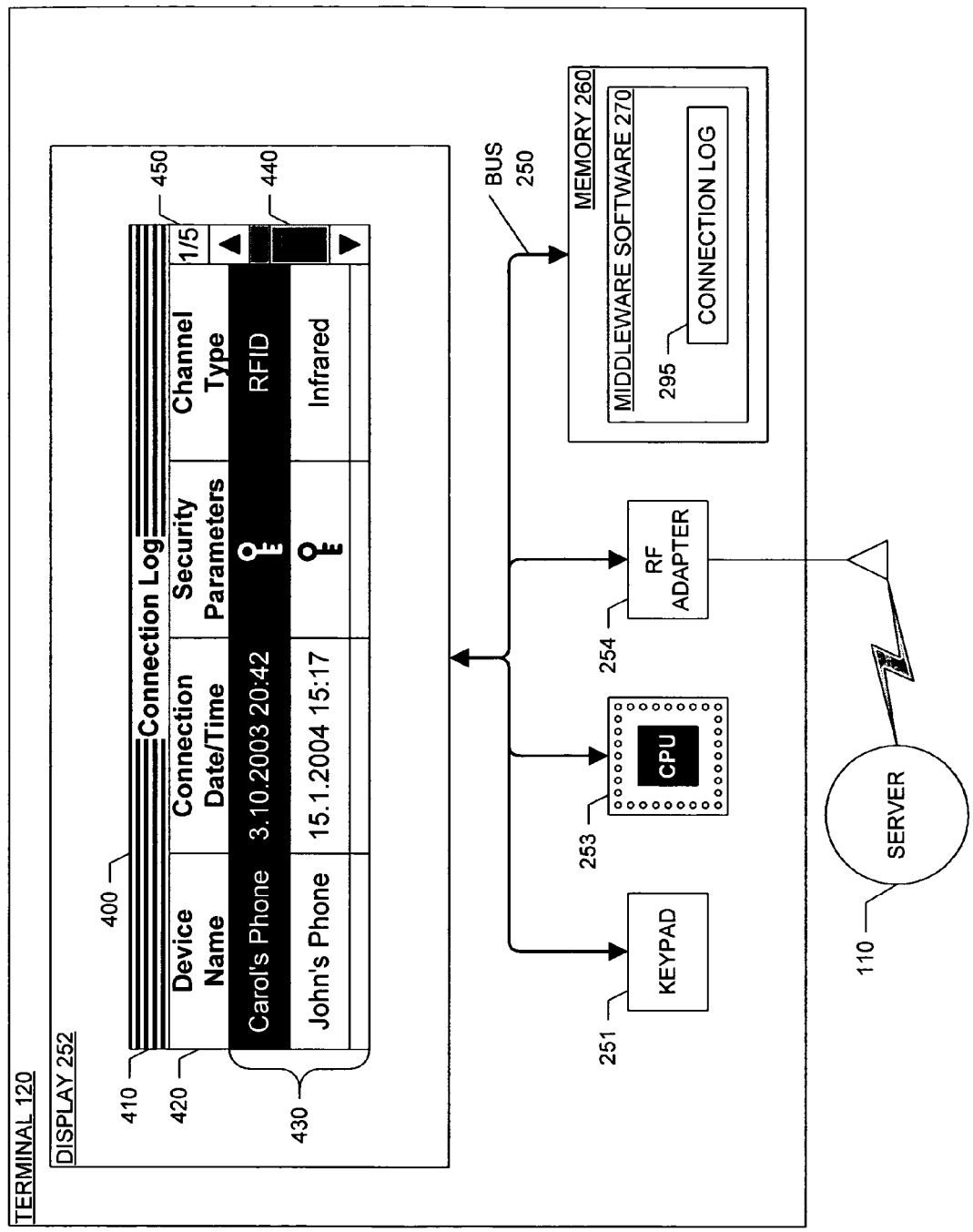
FIG. 4 illustrates is a diagram of a window depicting an embodiment of a graphical user interface for reconnecting a secure application program in a mobile ad-hoc communications network.

FIG. 4 illustrates is a diagram of a window depicting an embodiment of a graphical user interface for reconnecting a secure application program in a mobile ad-hoc communications network. The graphical user interface shown in FIG. 4 is resident in terminal 120 as shown in detail in FIG. 2B. Thus, like reference numbers and designations in FIGS. 2B and 4 refer to like elements. However, a reader of this disclosure should understand that the graphical user interface might reside similarly in server 110 as shown in detail in FIG. 2A.

As shown in FIG. 4, window 400 resides in display 252 of terminal 120. Window 400 includes the elements comprising the graphical user interface. Bus 250 is a communication medium that connects keypad 251, display 252, CPU 253, RF adapter 254, and memory 260. FIG. 4 shows display 252 and memory 260 as separate components. In another embodiment, CPU 253 stores window 400 is a display or video memory associated with display 252. However, in yet another embodiment, CPU 253 stores window 400 in a protected portion of memory 260.

Window 400 shown in FIG. 4 includes title bar 410, data header 420, display list 430, scroll bar 440, and index 450. Title bar 410 identifies the title of window 400 as "Connection Log". Data header 420 identifies the title for the columns comprising each entry in display list 430. Display list 430 includes one entry for each entry in connection log 295. If display list 430 is an empty list, there is no selected entry. If display list 430 is not an empty list, the graphical user interface will always consider one entry to be a selected entry and will display the selected entry in a format that differs visually from the display of the non-selected entries. FIG. 4 depicts the selected entry shown in reverse video as the entry in which "Device Name" is "Carol's Phone". Scroll bar 440 is a navigational element that provides an indication of the spatial location of the selected entry in display list 430. Scroll bar 440 includes an up arrow, a down arrow, a scroll region, and a scroll box in the scroll region. If the selected entry is the first entry in display list 430, the location of the scroll box is at the top-most portion of the scroll region. If the selected entry is the last entry in display list 430, the location of the scroll box is at the bottom-most portion of the scroll region. Otherwise, the location of the scroll box within the scroll region is proportional to the quotient of the index of the selected entry in display list 430 and the index of the last entry in display list 430, where the index of the first entry in display list 430 is one and the index of the last entry in display list 430 is equal to the number of entries in display list 430. Index 450 is another navigational element that provides an indication of the numerical location of the selected entry in display list 430. Index 450 includes two numbers separated by a slash. The number to the left of the slash is the index associated with the selected entry. The number to the right of the slash is the index associated with the last entry in display list 430 (i.e., the number of entries in display list 430).

Referring again to FIG. 4, CPU 253 executes the appropriate instructions to cause window 400 to appear in display 252 of terminal 120. CPU 253 sends a request to middleware software 270 via bus 250 for data from connection log 295. CPU 253 executes the appropriate instructions to store the data received in response to the request in display list 430. A user of terminal 120 may browse display list 430 shown in display 252. The user may also view detailed data for each entry in display list 430. The detailed data includes a name for the device (e.g., "Carol's Phone), a timestamp associated with the connection (e.g., Oct. 3, 2003, 20 hours, and 42 seconds), an indication of the presence of security parameters, and a channel type for the connection (e.g., RFID). The user may also operate an input device such as keypad 251 to change the entry in display list 430 that is the selected entry, and to choose to reconnect to the secure application program associated with the selected entry. In another embodiment, the user may operate keypad 251 to display additional detailed data associated with the selected entry.

Although the disclosed embodiments describe a fully functioning system and method for launching and controlling secure and non-secure application programs in wireless devices in a mobile ad-hoc communications network, the reader should understand that other equivalent embodiments exist. Since numerous modifications and variations will occur to those who review this disclosure, the system and method for launching and controlling secure and non-secure application programs resident in wireless devices in a mobile ad-hoc communications network is not limited to the exact construction and operation illustrated and disclosed. Furthermore, the disclosed invention may be distributed in the form of a computer readable medium of instructions including recordable media such as a removable disc, a hard disk drive, random access memory, flash memory, and read-only memory, as well as transmission media such as a digital or analog communication link. Accordingly, this disclosure intends all suitable modifications and equivalents to fall within the scope of the claims.

We claim:

1. A system comprising:
   a short-range ad hoc network that connects a wireless device to a nearby wireless device, each device including a memory device; and
   a processor disposed in communication with the memory device, the processor configured to:
   store an application directory in a middleware layer, the directory having at least one entry, each entry including an application program identifier, attributes, and security parameters;
   determine a priority for each entry in the application directory;
   identify a selected entry based on the priority;
   examine the attributes and the security parameters for the selected entry; and
   independently establish a security association to support a data communication when the security parameters direct the selected entry to use a secure connection.

2. The system of claim 1, wherein the processor is further configured to:
   receive a connection request from the nearby wireless device; and
   send a first application directory to the nearby wireless device;
   receive a second application directory from the nearby wireless device; and create the application directory by combining the first application directory and the second application directory.

3. The system of claim 1, wherein the attributes include a device identifier, a role, and control parameters.

4. The system of claim 3, wherein the control parameters include an application state, and at least one user-defined application setting.

5. The system of claim 1, wherein a bit-string includes the security parameters, a value of the bit-string representing each of the security parameters.

6. The system of claim 1, wherein the security parameters include an information security objective, a cryptography method for attaining the information security objective, and a level of security.

7. The system of claim 6, wherein the information security objective includes maintaining confidentiality, ensuring integrity, authenticating a party, and protecting against replay or reuse.

8. The system of claim 6, wherein the cryptography method includes a signature verification service, and an encryption algorithm.

9. The system of claim 6, wherein the level of security is a minimum required level of security.

10. The system of claim 1, wherein to determine the priority for each entry, the processor is further configured to:
compare the attributes for each entry in said at least one entry.

11. The system of claim 1, wherein to establish the security association, the processor is further configured to:
query a database for an existing security association between the wireless device and the nearby wireless device that will satisfy the security parameters;
reuse the existing security association when the query of the database is successful; and
create a new security association when the query of the database is unsuccessful.

12. The system of claim 11, wherein the processor is further configured to:
store the new security association in a connection log, wherein the query of the database includes examination of the connection log.

13. The system of claim 11, wherein to reuse the existing security association, the processor is further configured to:
notify the wireless device of the existing security association;
notify the nearby wireless device of the existing security association;
launch an application program that is referenced by the application program identifier associated with the selected entry when the attributes associated with the selected entry indicate an accommodating state for the launch of the application program; and
communicate over the secure connection with a counterpart application program on the nearby wireless device.

14. The system of claim 11, wherein to create the new security association, the processor is further configured to:
update the priority of the selected entry to defer the creating of the new security association.

15. The system of claim 11, wherein to create the new security association, the processor is further configured to:
establish a privileged side channel to the nearby wireless device;
negotiate the new security association over the privileged side channel; and
store the new security association.

16. The system of claim 15, wherein the privileged side channel includes a proximity-based communication means, including an infrared data association port, or a direct connection.

17. The system of claim 15, wherein to negotiate the new security association, the processor is further configured to:
send authentication data to the nearby wireless device;
receive counterpart authentication data from the nearby wireless device; and
generate the new security association based on the authentication data and the counterpart authentication data.

18. The system of claim 1, wherein when the security parameters direct the selected entry to use a non-secure connection, the processor is further configured to:
notify the wireless device of the non-secure connection;
notify the nearby wireless device of the non-secure connection;
launch an application program that is referenced by the application program identifier associated with the selected entry when the attributes associated with the selected entry indicate an accommodating state for the launch of the application program; and
communicate over the non-secure connection with a counterpart application program on the nearby wireless device.

19. The system of claim 1, wherein the wireless device initiates the data communication.

20. The system of claim 1, wherein the wireless device stores the application directory.

21. A method comprising:
connecting a wireless device to a nearby wireless device in a short-range network
storing an application directory in a memory including a middleware layer, the directory having at least one entry, each entry including an application program identifier, attributes, and security parameters;
determining a priority for each entry in the application directory;
identifying a selected entry based on the priority;
examining the attributes and the security parameters for the selected entry; and
independently establishing a security association to support the data communication when the security parameters direct the selected entry to use a secure connection.

22. The method of claim 21, further comprising:
receiving a connection request from the nearby wireless device; and
sending a first application directory to the nearby wireless device;
receiving a second application directory from the nearby wireless device; and
creating the application directory by combining the first application directory and the second application directory.

23. The method of claim 21, wherein the attributes include a device identifier, a role, and control parameters.

24. The method of claim 23, wherein the control parameters include an application state, and at least one user-defined application setting.

25. The method of claim 21, wherein a bit-string includes the security parameters, a value of the bit-string representing each of the security parameters.

26. The method of claim 21, wherein the security parameters include an information security objective, a cryptography method for attaining the information security objective, and a level of security.

27. The method of claim 26, wherein the information security objective includes maintaining confidentiality, ensuring integrity, authenticating a party, and protecting against replay or reuse.

28. The method of claim 26, wherein the cryptography method includes a signature verification service, and an encryption algorithm.

29. The method of claim 26, wherein the level of security is a minimum required level of security.

30. The method of claim 21, wherein the determining of the priority for each entry further comprises:
comparing the attributes for each entry in said at least one entry.

31. The method of claim 21, wherein the establishing of the security association further comprises:
querying a database for an existing security association between the wireless device and the nearby wireless device that will satisfy the security parameters;
reusing the existing security association when the query of the database is successful; and
creating a new security association when the query of the database is unsuccessful.

32. The method of claim 31, further comprising:
storing the new security association in a connection log, wherein the query of the database includes examination of the connection log.

33. The method of claim 31, wherein the reusing of the existing security association further comprises:
notifying the wireless device of the existing security association;
notifying the nearby wireless device of the existing security association;
launching an application program that is referenced by the application program identifier associated with the selected entry when the attributes associated with the selected entry indicate an accommodating state for the launch of the application program; and
communicating over the secure connection with a counterpart application program on the nearby wireless device.

34. The method of claim 31, wherein the creating of the new security association further comprises:
updating the priority of the selected entry to defer the creating of the new security association.

35. The method of claim 31, wherein the creating of the new security association further comprises:
establishing a privileged side channel to the nearby wireless device;
negotiating the new security association over the privileged side channel; and
storing the new security association.

36. The method of claim 35, wherein the privileged side channel includes a proximity-based communication means, including an infrared data association port, or a direct connection.

37. The method of claim 35, wherein the negotiating of the new security association further comprises:
sending authentication data to the nearby wireless device;
receiving counterpart authentication data from the nearby wireless device; and
generating the new security association based on the authentication data and the counterpart authentication data.

38. The method of claim 21, wherein when the security parameters direct the selected entry to use a non-secure connection, the method further comprises:
notifying the wireless device of the non-secure connection;
notifying the nearby wireless device of the non-secure connection;
launching an application program that is referenced by the application program identifier associated with the selected entry when the attributes associated with the selected entry indicate an accommodating state for the launch of the application program; and
communicating over the non-secure connection with a counterpart application program on the nearby wireless device.

39. The method of claim 21, wherein the wireless device initiates the data communication.

40. The method of claim 21, wherein the wireless device stores the application directory.

41. A computer program product, tangibly stored on a computer-readable medium, such as a removable disc, a hard disk drive, random access memory, flash memory, and read-only memory, executable in a computer system, comprising instructions operable to cause a programmable processor to:
store an application directory in a memory including a middleware layer of a device in an ad hoc network, the directory having at least one entry, each entry including an application program identifier, attributes, and security parameters;
determine a priority for each entry in the application directory;
identify a selected entry based on the priority;
examine the attributes and the security parameters for the selected entry; and
independently establish a security association to support the data communication when the security parameters direct the selected entry to use a secure connection.

42. The computer program product of claim 41, further comprising instructions operable to cause the programmable processor to:
receive a connection request from the nearby wireless device; and
send a first application directory to the nearby wireless device;
receive a second application directory from the nearby wireless device; and
create the application directory by combining the first application directory and the second application directory.

43. The computer program product of claim 41, further comprising instructions operable to cause the programmable processor to:
compare the attributes for each entry in said at least one entry.

44. The computer program product of claim 41, further comprising instructions operable to cause the programmable processor to:
query a database for an existing security association between the wireless device and the nearby wireless device that will satisfy the security parameters;
reuse the existing security association when the query of the database is successful; and
create a new security association when the query of the database is unsuccessful.

45. The computer program product of claim 44, further comprising instructions operable to cause the programmable processor to:
store the new security association in a connection log, wherein the query of the database includes examination of the connection log.

46. The computer program product of claim 44, further comprising instructions operable to cause the programmable processor to:
- notify the wireless device of the existing security association;
- notify the nearby wireless device of the existing security association;
- launch an application program that is referenced by the application program identifier associated with the selected entry when the attributes associated with the selected entry indicate an accommodating state for the launch of the application program; and
- communicate over the secure connection with a counterpart application program on the nearby wireless device.

47. The computer program product of claim 44, further comprising instructions operable to cause the programmable processor to:
- update the priority of the selected entry to defer the creating of the new security association.

48. The computer program product of claim 44, further comprising instructions operable to cause the programmable processor to:
- establish a privileged side channel to the nearby wireless device;
- negotiate the new security association over the privileged side channel; and
- store the new security association.

49. The computer program product of claim 48, further comprising instructions operable to cause the programmable processor to:
- send authentication data to the nearby wireless device;
- receive counterpart authentication data from the nearby wireless device; and
- generate the new security association based on the authentication data and the counterpart authentication data.

50. The computer program product of claim 41, wherein when the security parameters direct the selected entry to use a non-secure connection, the computer program product further comprises instructions operable to cause the programmable processor to:
- notify the wireless device of the non-secure connection;
- notify the nearby wireless device of the non-secure connection;
- launch an application program that is referenced by the application program identifier associated with the selected entry when the attributes associated with the selected entry indicate an accommodating state for the launch of the application program; and
- communicate over the non-secure connection with a counterpart application program on the nearby wireless device.

51. A system comprising:
- a memory;
- means for storing an application directory in a the memory including a middleware layer of a device in an ad hoc network, the directory having at least one entry, each entry including an application program identifier, attributes, and security parameters;
- means for determining a priority for each entry in the application directory;
- means for identifying a selected entry based on the priority;
- means for examining the attributes and the security parameters for the selected entry; and
- means for independently establishing a security association to support the data communication when the security parameters direct the selected entry to use a secure connection.

52. The system of claim 51, further comprising:
- means for receiving a connection request from the nearby wireless device; and
- means for sending a first application directory to the nearby wireless device;
- means for receiving a second application directory from the nearby wireless device; and
- means for creating the application directory by combining the first application directory and the second application directory.

53. The system of claim 51, wherein the determining of the priority for each entry further comprises:
- means for comparing the attributes for each entry in said at least one entry.

54. The system of claim 51, wherein the means for the establishing of the security association further comprises:
- means for querying a database for an existing security association between the wireless device and the nearby wireless device that will satisfy the security parameters;
- means for reusing the existing security association when the query of the database is successful; and
- means for creating a new security association when the query of the database is unsuccessful.

55. The system of claim 54, further comprising:
- means for storing the new security association in a connection log,
- wherein the query of the database includes examination of the connection log.

56. The system of claim 54, wherein the means for the reusing of the existing security association further comprises:
- means for notifying the wireless device of the existing security association;
- means for notifying the nearby wireless device of the existing security association;
- means for launching an application program that is referenced by the application program identifier associated with the selected entry when the attributes associated with the selected entry indicate an accommodating state for the launch of the application program; and
- means for communicating over the secure connection with a counterpart application program on the nearby wireless device.

57. The system of claim 54, wherein the means for the creating of the new security association further comprises:
- means for updating the priority of the selected entry to defer the creating of the new security association.

58. The system of claim 54, wherein the means for the creating of the new security association further comprises:
- means for establishing a privileged side channel to the nearby wireless device;
- means for negotiating the new security association over the privileged side channel; and
- means for storing the new security association.

59. The system of claim 58, wherein the means for the negotiating of the new security association further comprises:
- means for sending authentication data to the nearby wireless device;
- means for receiving counterpart authentication data from the nearby wireless device; and
- means for generating the new security association based on the authentication data and the counterpart authentication data.

60. The system of claim 51, wherein when the security parameters direct the selected entry to use a non-secure connection, further comprising:
- means for notifying the wireless device of the non-secure connection;

means for notifying the nearby wireless device of the non-secure connection;

means for launching an application program that is referenced by the application program identifier associated with the selected entry when the attributes associated with the selected entry indicate an accommodating state for the launch of the application program; and means for communicating over the non-secure connection with a counterpart application program on the nearby wireless device.

61. A system comprising:

a short-range ad hoc network that connects a wireless device to a nearby wireless device, each device including a memory device; and a processor disposed in communication with the memory device, the processor configured to:

store in a middleware layer in the memory of the wireless device a security association between the wireless device and the nearby wireless device when the nearby wireless device enters the ad-hoc network for a first encounter;

store a copy of the security association;

remove the security association when the first encounter terminates; and independently establish a secure connection to the nearby wireless device based on the copy of the security association when the nearby wireless device enters the ad-hoc network for a second encounter.

62. The system of claim 61, wherein the storing of the security association is to a short-term storage device.

63. The system of claim 61, wherein the storing of the copy of the security association is to a long-term storage device.

64. The system of claim 61, wherein to establish the secure connection to the nearby wireless device based on the copy of the security association when the nearby wireless device enters the ad-hoc network for the second encounter, the processor is further configured to:

search a connection log to locate the copy of the security association;

launch the application program associated with the copy of the security association;

configure the secure connection using the security parameters associated with the copy of the security association; and communicate over the secure connection with the counterpart application program.

65. The system of claim 64, wherein the processor is further configured to:

verify that the copy of the security association will satisfy the security parameters for the second encounter.

66. The system of claim 64, wherein to search the connection log to locate the copy of the security association, the processor is further configured to:

retrieve at least one previous connection from the connection log; and identify one of said at least one previous connection as the copy of the security association.

67. A method comprising:

storing a security association in a memory including a middleware layer between wireless device and the nearby wireless device in an ad hoc network when the nearby wireless device enters the ad-hoc network for a first encounter;

storing a copy of the security association;

removing the security association when the first encounter terminates; and independently establishing a secure connection to the nearby wireless device based on the copy of the security association when the nearby wireless device enters the ad-hoc network for a second encounter.

68. The method of claim 67, wherein the storing of the security association is to a short-term storage device.

69. The method of claim 67, wherein the storing of the copy of the security association is to a long-term storage device.

70. The method of claim 67, wherein the establishing of the secure connection to the nearby wireless device based on the copy of the security association when the nearby wireless device enters the ad-hoc network for the second encounter further comprises:

searching a connection log to locate the copy of the security association;

launching the application program associated with the copy of the security association;

configuring the secure connection using the security parameters associated with the copy of the security association; and communicating over the secure connection with the counterpart application program.

71. The method of claim 70, further comprising:

verify that the copy of the security association will satisfy the security parameters for the second encounter.

72. The method of claim 70, wherein the searching of the connection log to locate the copy of the security association further comprises:

retrieving at least one previous connection from the connection log; and identifying one of said at least one previous connection as the copy of the security association.

73. A computer program product, tangibly stored on a computer-readable medium, such as a removable disc, a hard disk drive, random access memory, flash memory, and read-only memory, executable in a computer system, comprising instructions operable to cause a programmable processor to:

store in a memory of a wireless device including a middleware layer in an ad hoc network a security association between the wireless device and nearby wireless device when the nearby wireless device enters the ad-hoc network for a first encounter;

store a copy of the security association;

remove the security association when the first encounter terminates; and independently establish a secure connection to the nearby wireless device based on the copy of the security association when the nearby wireless device enters the ad-hoc network for a second encounter.

74. The computer program product of claim 73, further comprising instructions operable to cause the programmable processor to:

search a connection log to locate the copy of the security association;

launch the application program associated with the copy of the security association;

configure the secure connection using the security parameters associated with the copy of the security association; and communicate over the secure connection with the counterpart application program.

75. The computer program product of claim 74, further comprising instructions operable to cause the programmable processor to:

verify that the copy of the security association will satisfy the security parameters for the second encounter.

76. The computer program product of claim 74, further comprising instructions operable to cause the programmable processor to:
- retrieve at least one previous connection from the connection log; and
- identify one of said at least one previous connection as the copy of the security association.

77. A system comprising: a memory;
- means for storing in the memory of a wireless device including a middleware a security association between the wireless device and nearby wireless device when the nearby wireless device enters an ad-hoc network for a first encounter;
- means for storing a copy of the security association;
- means for removing the security association when the first encounter terminates; and
- means for independently establishing a secure connection to the nearby wireless device based on the copy of the security association when the nearby wireless device enters the ad-hoc network for a second encounter.

78. The system of claim 77, wherein the means for establishing the secure connection to the nearby wireless device based on the copy of the security association when the nearby wireless device enters the ad-hoc network for the second encounter further comprises:
- means for searching a connection log to locate the copy of the security association;
- means for launching the application program associated with the copy of the security association;
- means for configuring the secure connection using the security parameters associated with the copy of the security association; and
- means for communicating over the secure connection with the counterpart application program.

79. The system of claim 78, further comprising:
- means for verifying that the copy of the security association will satisfy the security parameters for the second encounter.

80. The system of claim 78, wherein the means for searching the connection log to locate the copy of the security association further comprises:
- means for retrieving at least one previous connection from the connection log; and
- means for identifying one of said at least one previous connection as the copy of the security association.

81. A video display including a graphical user interface comprising:
- a first region of the video display connected to the wireless device, the first region including a display list storing at least one previous connection between the wireless device and the nearby wireless device,
- wherein a user operates an input device connected to the wireless device to identify one of said at least one previous connection as a selected previous connection, and
- wherein the user operates the input device connected to the wireless device to launch the application program stored in a memory including a middleware layer and associated with the selected previous connection, configure the secure connection using the security parameters associated with the selected previous connection, and communicate over the secure connection with the counterpart application program.

82. The video display of claim 81, wherein a memory connected to the wireless device stores a connection log that includes connection data, and wherein the connection data populates the display list.

83. The video display of claim 81, wherein to identify one of said at least at least one previous connection as the selected previous connection, the user selects an item in the display list by highlighting the item, displaying the item in reverse video, or displaying the item in a different font type, font size, or font style.

84. The video display of claim 81, wherein the user verifies that the selected previous connection is a copy of the entry.

85. Apparatus, comprising:
- a first network element for storing an application directory in a memory including a middleware layer, the directory having at least one entry, each entry including an application program identifier, attributes, and security parameters;
- a second network element for determining a priority for each entry in the application directory;
- a third network element for identifying a selected entry based on the priority;
- a fourth network element for examining the attributes and the security parameters for the selected entry; and
- a fifth network element for independently establishing a security association to support data communication when the security parameters direct the selected entry to use a secure connection.

86. An apparatus comprising:
- a memory;
- a wireless network interface configured to provide a wireless connection with a nearby wireless device; and
- a processor disposed in communication with the memory device, the processor configured to:
  - store an application directory in a middleware layer, the directory having at least one entry, each entry including at least an application program identifier, attributes, and security parameters;
  - exchange the application directory data with the nearby wireless device over the wireless connection to form a distributed application directory;
  - determine a priority for each entry in the distributed application directory;
  - select an entry based on the priorities determined for each entry in the distributed application directory;
  - examine the attributes and the security parameters associated with the selected entry to establish a data communication for connecting with an application in the nearby device corresponding with the selected entry, and
  - independently establish a security association to support the data communication connection when the selected entry includes security parameters directing use of a secure connection satisfying the security parameters when connecting with the application in the nearby device.

87. The apparatus of claim 86 wherein the processor is further configured to determine whether there already exists a security association with the nearby device that is compliant and meets a security level associated with the parameters of the selected entry.

* * * * *

UNITED STATES PATENT AND TRADEMARK OFFICE
CERTIFICATE OF CORRECTION

| | | |
|---|---|---|
| PATENT NO. | : 7,545,941 B2 | Page 1 of 1 |
| APPLICATION NO. | : 10/784215 | |
| DATED | : June 9, 2009 | |
| INVENTOR(S) | : Sovio et al. | |

It is certified that error appears in the above-identified patent and that said Letters Patent is hereby corrected as shown below:

On Title page, Delete Item (63):

"(63) Continuation-in-part of application No. 10/662,407, filed on Sep. 16, 2003."

Signed and Sealed this
First Day of May, 2012

David J. Kappos
*Director of the United States Patent and Trademark Office*